United States Patent [19]
Albert et al.

[11] Patent Number: 5,641,237
[45] Date of Patent: Jun. 24, 1997

[54] GARDEN TOOL SLEEVE

[75] Inventors: Barry R. Albert, Dillsburg; Christopher T. Rich, Lancaster, both of Pa.

[73] Assignee: True Temper Hardware Company, Camp Hill, Pa.

[21] Appl. No.: 553,971

[22] Filed: Nov. 7, 1995

[51] Int. Cl.[6] .................................................. B25G 1/04
[52] U.S. Cl. .......................... 403/372; 403/365; 403/377; 403/109; 172/371; 56/400.01
[58] Field of Search ................................ 403/372, 371, 403/365, 309–311, 313, 314, 325, 326, 329, 195, 255–226, 377, 109; 172/371–381; 56/400.01, 400.04, 400.17, 400.18, DIG. 18; 81/177.1, 177.2; 30/308.1, 308.2, 308.3, 340

[56] References Cited

U.S. PATENT DOCUMENTS

| | | | |
|---|---|---|---|
| 1,530,225 | 3/1925 | Belakoy . | |
| 2,793,902 | 5/1957 | Govan, Jr. | 294/57 |
| 2,982,586 | 5/1961 | Gliebe | 403/326 X |
| 3,187,363 | 6/1965 | Auwarter | 403/397 X |
| 3,380,097 | 4/1968 | Pharris | 403/371 X |
| 3,549,189 | 12/1970 | Alosi | 294/57 |
| 4,247,216 | 1/1981 | Pansini | 403/329 X |
| 4,790,586 | 12/1988 | Stoner, Jr. | 294/57 |
| 4,829,857 | 5/1989 | Jones | 81/177.1 |
| 4,841,597 | 6/1989 | Kolonia | 16/114 R |
| 5,127,762 | 7/1992 | Havlovitz | 403/300 X |
| 5,161,278 | 11/1992 | Tomm | 15/159.1 |
| 5,172,447 | 12/1992 | Tomm | 15/159.1 |
| 5,272,788 | 12/1993 | Gilstrap | 16/114 R |
| 5,477,929 | 12/1995 | Kenyon et al. | 403/365 X |

*Primary Examiner*—Kenneth J. Dorner
*Assistant Examiner*—Harry C. Kim
*Attorney, Agent, or Firm*—Eckert Seamans Cherin & Mellott

[57] ABSTRACT

A sleeve for coupling a tool to a handle includes a collar, a shank and a pair of resilient clips. The collar defines proximal and distal ends, and includes an exterior surface which converges from the proximal end toward the distal end. In addition, the collar includes a central bore for receiving a shaft of the tool. In an especially preferred form, the central bore is so dimensioned as to fit closely around a shaft of the tool. In addition, the exterior surface of the collar meets an interior surface of the central bore at a right or acute angle. Then, the portion of the exterior surface of the collar near the juncture with the interior surface of the central bore acts as a knife edge to scrape deposits such as caked mud from the shaft of the tool as the shaft is inserted into the sleeve. The sleeve is preferably formed from a weather-resistant plastic and the proximal end of the collar preferably has an outer diameter greater than an outer diameter of an adjacent portion of the shank so as to provide some protection to an end of the handle against corrosion due to exposure to the elements.

16 Claims, 2 Drawing Sheets

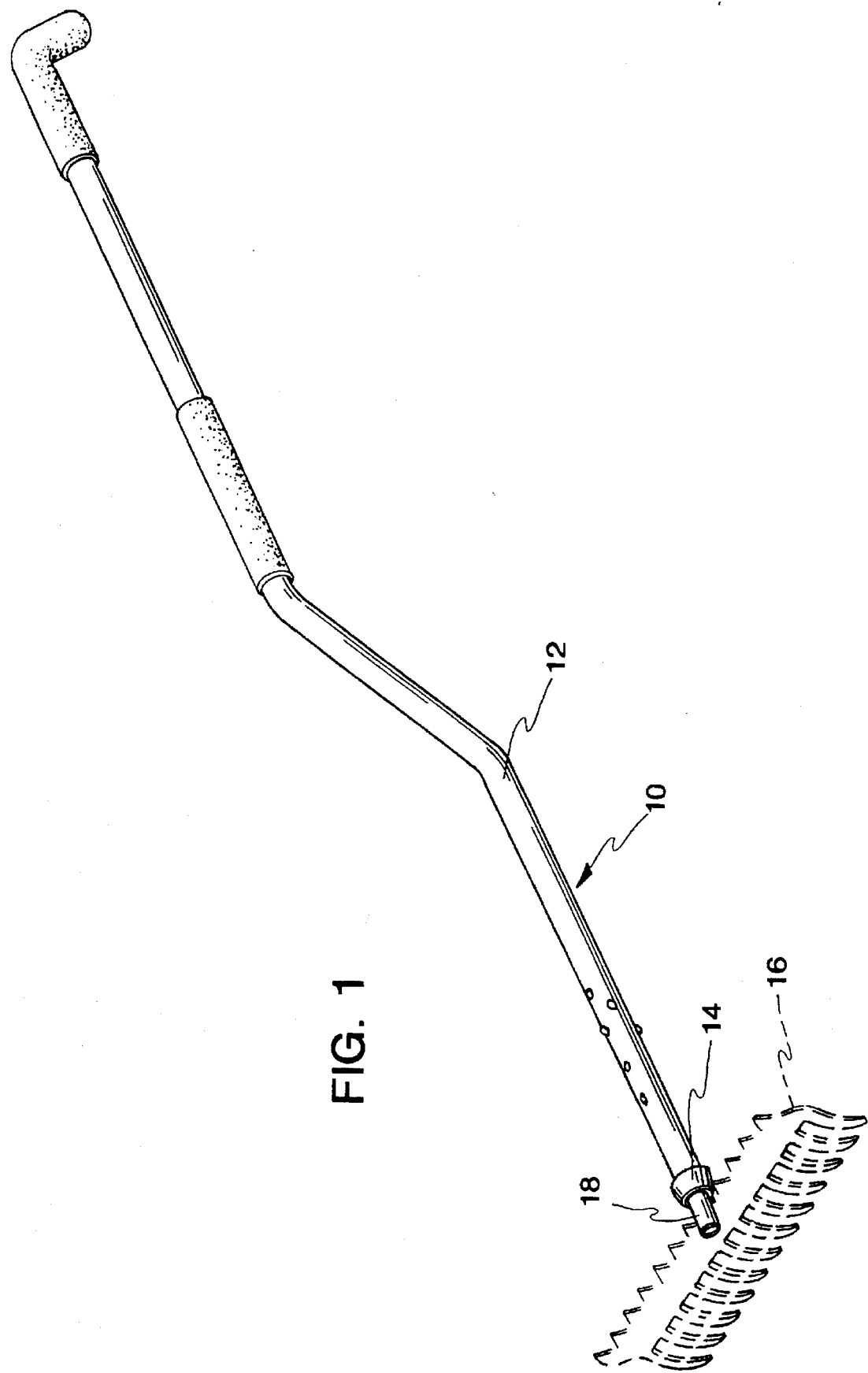

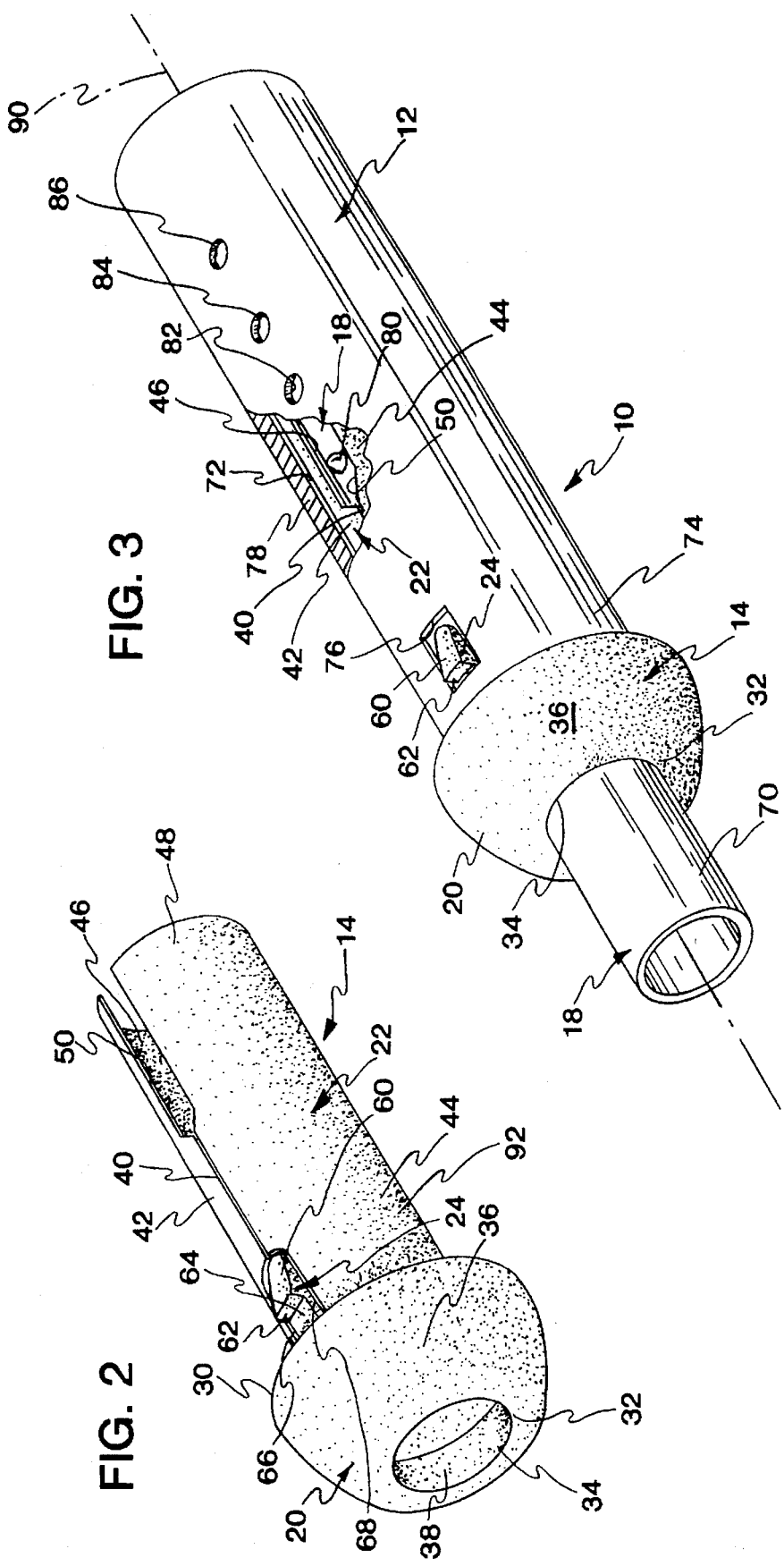

GARDEN TOOL SLEEVE

BACKGROUND OF THE INVENTION

1. Field of the Invention

This invention relates to implements applicable to fields such as plant husbandry, and more particularly, it relates to a fitting for coupling a tool to a handle for manual use.

2. Description of the Related Art

Manual implements such as rakes and shovels are commonly used in lawn care and private gardening due to their low cost and ease of storage. Such implements typically comprise tools coupled to elongated handles which users grip with both hands to manipulate. Couplings constructed to permit the replacement of one tool coupled to a handle with another tool have been proposed. On the one hand, such couplings must be capable of binding the tools to the handles with sufficient firmness that the tools will not detach during use. On the other hand, the tools must be easily replaced when desired.

Handles and couplings for manual gardening and lawn care tools are typically formed from wood or metal. These wooden and metal parts are subject to corrosion due to exposure to the elements. Even where a handle is lacquered or otherwise coated to minimize corrosion, the end of the handle facing a replaceable tool is typically uncoated and exposed to corrosive influences. In addition, mud and clay cakes on gardening and lawn care tools during use. Deposits of caked dry mud and clay on a tool are capable of interfering when one seeks to recouple the tool to the handle. Such deposits may be scraped off the tool by hand before recoupling the tool to the handle. Nonetheless, there remains a need in the art for a coupling which is weather-resistant and which is capable of simultaneously loosening or dislodging deposits on the tool shaft as the tool is inserted into the coupling.

SUMMARY OF THE INVENTION

This need is addressed by a sleeve for coupling a tool to a handle comprising a collar, a shank and a pair of resilient clips. The collar defines proximal and distal ends, and includes an exterior surface which converges from the proximal end toward the distal end. In addition, the collar includes a central bore for receiving a shaft of the tool. The shank fits into an elongated cavity in an end of the handle.

In an especially preferred form, the central bore is so dimensioned as to fit closely around the shaft. The exterior surface of the collar meets an interior surface of the central bore at a right or acute angle. Then, the portion of the exterior surface of the collar near the juncture with the interior surface of the central bore acts as a knife edge to scrape deposits such as caked mud from the shaft of the tool as the shaft is inserted into the sleeve.

The shank and the resilient clips are inserted into the elongated cavity in the handle and cooperate to secure the sleeve on the handle. The shank depends from the collar and defines a passageway concentric with the central bore for receiving a shaft of the tool. The shank also defines a pair of opposed elongated splits and a pair of elongated apertures which preferably divide the shank into oppositely-biased arms for frictional engagement against a boundary wall of the elongated cavity in the end of the handle. The resilient clips are positioned on the shank near the collar and are each preferably aligned with one of the splits in the shank. The resilient clips engage the boundary wall of the elongated cavity to couple the sleeve to the handle.

The pair of elongated apertures in the shank allow the passage of a detent for positioning the shaft relative to the handle. Preferably, the handle includes a series of sockets aligned parallel to an axis of the handle. The detent has a fixed position on the shaft and fits into one of the sockets. The elongated apertures are sufficiently long to expose each of the sockets to the shaft through the apertures. The length of the implement is adjustable by moving the shaft inwardly and outwardly in the sleeve to position the tool relative to the handle.

In an especially preferred form, the sleeve is a unitary part formed from a weather-resistant plastic. The proximal end of the collar is larger in diameter than the adjacent portion of the shank to provide some protection for the end of the handle against corrosion when the implement is assembled. The use of a weather-resistant plastic rather than wood for the coupling allows the fit between the sleeve and the shaft of the tool to be closer, because the plastic does not swell in humid conditions to the degree that wood does. This closeness, in turn, promotes the removal of deposits as the shaft is inserted into the sleeve.

Therefore, it is one object of the invention to provide a weather-resistant sleeve capable of providing a sufficiently firm connection for use in a manual implement, and which provides means for removing deposits from the surface of the tool shaft as the shaft is inserted into the sleeve. This object, and others, may be more readily understood in connection with the following specification, claims and drawings.

BRIEF DESCRIPTION OF THE DRAWINGS

FIG. 1 is an elevational view of a manual implement incorporating the present invention;

FIG. 2 is a perspective view of a sleeve in accordance with the invention;

FIG. 3 is a partial view of the manual implement of FIG. 1 partially cut away to show a detent for positioning a tool relative to a handle of the implement.

DETAILED DESCRIPTION OF THE PREFERRED EMBODIMENT

FIG. 1 shows a manual implement or garden rake 10 including an elongated handle 12, a sleeve 14 and a tool 16, the latter shown partially in phantom. The tool 16 includes a shaft 18 which extends into the sleeve 14 to couple the tool 16 to the handle 12.

As best shown in FIG. 2, the sleeve 14 includes a collar 20, a split shank 22 and a pair of resilient clips 24 (one clip not shown, being a mirror image of clip 24). The collar 20 defines a proximal end 30 and a distal end 32. In addition, the collar 20 defines a central bore 34 which passes from the proximal end 30 to the distal end 32. An external surface 36 of the collar 20 converges from the proximal end 30 toward the distal end 32, and meets an internal wall 38 of the central bore 34 near the distal end 32 at a right or acute angle.

The split shank 22 extends from the proximal end 30 of the collar 20 and includes a pair of splits 40 (one split not shown, being a mirror image of split 40) which define a pair of oppositely-biased arms 42, 44. The oppositely-biased arms 42, 44 are semi-circular in cross-section so as to define a passageway 46, but taper outwardly from the proximal end 30 of the collar 20 toward a free end 48 of the shank 22. A pair of elongated apertures 50 (one elongated aperture not shown, being a mirror image of elongated aperture 50) are centered with respect to the splits 40 and extend to the free end 48 of the split shank 22.

The resilient clips 24 (only one shown) depend from the proximal end 30 of the collar 20 and are aligned with the splits 40 (only one shown). The resilient clips 24 each include a wedge portion 60 terminating in a shoulder 62 facing the proximal end 30 of the collar 20 and a web portion 64 connecting the wedge portion 60 with the collar 20. The resilient clips 24 are each separated from the split shank 22 by a pair of slits 66, 68 which fork off from the splits 40 and extend along the peripheries of the wedge portion 60 and web portion 64 of that resilient clip 24.

The assembly of the manual implement 10 is best illustrated by reference to FIG. 3. A substantially cylindrical end portion 70 of the shaft 18 of the tool 16 (FIG. 1) extends through the central bore 34 of the collar 20 of the sleeve 14 and into the passageway 46 in the split shank 22. The split shank 22, in turn, extends into an elongated cavity 72 near an end portion 74 of the handle 12. The clips 24 (only one shown) of the sleeve 14 project into slots 76 (one slot not shown, being a mirror image of slot 76) such that the shoulders 62 abut against sides of the slots 76 to retain the sleeve 14 in the elongated cavity 72. In addition, the arms 42, 44 of the split shank 22 press against a boundary wall 78 of the elongated cavity 72 to further secure the sleeve 14 to the handle 12.

The shaft 18 includes a spring-loaded detent 80 which cooperates with a series of sockets 82, 84, 86 in the boundary wall 78 to position the tool 16 (FIG. 1) with respect to the handle 12. The sockets 82, 84, 86 are aligned with respect to one of the slots 76 parallel to an axis 90 of the handle 12. (The number of sockets and their spacing is not critical to the invention.) Furthermore, the resilient clips 24 and the elongated apertures 50 are each aligned with the splits 40, which are aligned, in turn, with the axis 90. The detent 80 projects through one of the apertures 50 into one of the sockets (not shown) in the boundary wall 78 to position the shaft 18 and the tool 16 (FIG. 1) along the axis 90 relative to the handle 12.

The sleeve 14 is coupled to the handle 12 by first pressing the two arms 42, 44 of the split shank 22 of the sleeve 14 together. The split shank 22 is then inserted into the elongated cavity 72 in the handle 12 with the resilient clips 24 aligned with the slots 76 in the boundary wall 78 of the elongated cavity 72. The relative angle between the boundary wall 78 and the wedge portions 60 of the resilient clips 24 causes the web portions 64 (FIG. 2) of the resilient clips 24 to flex to permit the resilient clips 24 to pass into the elongated cavity 72. When the sleeve 14 has been pressed far enough into the elongated cavity 72 so that the resilient clips 24 align with the slots 76, the web portions 64 straighten out so that the shoulders 62 engage the slots 76. Meanwhile, the arms 42, 44 expand against the boundary wall 78.

The tool 16 (FIG. 1) is coupled to the sleeve 14 and the handle 12 by sliding the shaft 18 into the central bore 34 of the collar 20. Since the shaft 18 fits closely in the central bore 34 and the exterior surface 36 of the collar 20 converges toward the distal end 32 at a right or acute angle, the exterior surface 36 near distal end 32 of the collar 20 acts as a knife edge to scrape off any deposits from the surface of the shaft 18 as the shaft 18 slides into the central bore 34. Preferably, the detent 80 is inclined so that it retracts into the shaft 18 when the shaft 18 is pressed into the central bore 34. Alternatively, the detent 80 may be depressed into the shaft 18 prior to insertion. Once the shaft 18 is pressed through the central bore 34 and into the passageway 46 a desired distance, the shaft 18 is rotated to align the detent 80 with one of the elongated apertures 50 and one of the sockets 82, 84, 86 to retain the tool 16 (FIG. 1) in the desired position relative to the handle 12. In order to remove the tool 16 (FIG. 1) for replacement, one reverses the process of assembly. The detent 80 is depressed either by hand or with a tool capable of extending into the sockets 82, 84, 86, and the shaft 18 is pulled out through the central bore 34.

The sleeve 14 is preferably formed from a weather-resistant plastic material. The proximal end 30 of the collar 20, which has an outer diameter greater than an outer diameter of the distal end 32 and of an adjacent portion 92 of the split shank 22, fits against the end portion 74 of the handle 12 to provide some protection for the end portion 74 against corrosion. Furthermore, the shaft 18 fits through the central bore 34 and extends into the passageway 46 but preferably does not contact the boundary wall 78 of the elongated cavity 72, This provides protection for the inner surface of the boundary wall 78 both from corrosion and from possible abrasion by deposits (not shown) on the shaft 18 not removed when the shaft 18 is slid into the central bore 34.

Various changes or modifications in the invention described may occur to those skilled in the art without departing from the true spirit or scope of the invention. The above description of the invention is meant to be illustrative only and not limiting, and it is not intended that the invention be restricted thereto but that it be limited only by the true spirit and scope of the appended claims.

What is claimed is:

1. A sleeve for coupling a tool to a handle for manual use comprising:

a collar including a central bore, a proximal end, and a distal end;

an elongated shank defining a passageway concentric with said central bore, said shank including an end adjacent to the collar and an opposing free end, said shank depending longitudinally from the proximal end of the collar;

at least one resilient clip including an end adjacent to the collar, an opposing free end, and a wedge portion, said clip depending longitudinally from the proximal end of said collar toward the free end of the shank, said wedge portion extending radially outwardly from the free end of the clip; and spacing means on said shank defining at least one elongated aperture extending from the free end of the shank longitudinally toward the collar such that said at least one aperture is axially spaced from said at least one clip.

2. The sleeve as recited in claim 1 wherein an exterior surface of said collar converges toward the distal end of said collar spaced from the proximal end of said collar.

3. The sleeve as recited in claim 1 wherein said shank includes at least one split extending from the end of the shank adjacent to the collar to the free end of the shank.

4. The sleeve as recited in claim 1 wherein:

the proximal end of said collar has an outer diameter greater than an outer diameter of an adjacent portion of said shank.

5. The sleeve as recited in claim 1 wherein:

an exterior surface of said collar converges toward the distal end of said collar spaced from the proximal end of said collar;

the proximal end of said collar has an outer diameter greater than an outer diameter of an adjacent portion of said shank;

the shank includes at least one split running from the end of the shank adjacent to the collar to the free end of the shank; and the collar, the shank, and said at least one clip are formed as a unitary part from plastic.

6. The sleeve as recited in claim 5 comprising:

a pair of opposed splits defining a pair of oppositely-biased arms; and a pair of opposed clips and a pair of opposed apertures centered on the splits;

wherein the clips are each separated from the shank by a pair of slits, and said slits fork off from said splits and extend along the peripheries of respective ones of said clips.

7. A sleeve, in combination with handle, for coupling a tool to the handle for manual use comprising:

a collar including a central bore, a proximal end, and a distal end;

an elongated shank including an end adjacent to the collar and an opposing free end, said shank depending longitudinally from the proximal end of said collar, said shank defining a passageway concentric with the central bore for receiving a shaft;

at least one resilient clip including an end adjacent to the collar, an opposing free end, and a wedge portion, said clip depending longitudinally from the proximal end of the collar toward the free end of the shank, said wedge portion extending radially outwardly from the free end of the clip; and spacing means on said shank defining at least one elongated aperture, said aperture extending from the free end of the shank longitudinally toward the collar such that said at least one aperture is axially spaced from said at least one clip; and wherein said handle includes an elongated cavity having a boundary wall defining at least one slot aligned with said at least one clip and at least one socket aligned with said at least one aperture.

8. The combination as recited in claim 7 wherein:

the shank includes at least one split running from the end of the shank adjacent to the collar to the free end of the shank.

9. The combination as recited in claim 7 wherein:

the proximal end of said collar has an outer diameter greater than an outer diameter of an adjacent portion of said shank.

10. The combination as recited in claim 7 wherein:

an exterior surface of the collar converges toward the distal end spaced from the proximal end;

the proximal end of said collar has an outer diameter greater than an outer diameter of an adjacent portion of said shank;

the shank includes at least one split running from the end of the shank adjacent to the collar to the free end of the shank; and the collar, the shank, and said at least one clip are formed as a unitary part from plastic.

11. The combination as recited in claim 10 comprising:

a pair of opposed splits defining a pair of oppositely-biased arms; and a pair of opposed clips and a pair of opposed apertures centered on the splits;

wherein the clips are each separated from the shank by a pair of slits, and said slits fork off from said splits and extend along the peripheries of respective ones of said clips.

12. A sleeve for coupling a tool to a handle, in combination with said handle and said tool, said sleeve comprising:

collar including a central bore for receiving a shaft of the tool, a proximal end, and a distal end;

a shank depending from the proximal end of said collar, said shank defining a passageway concentric with the central bore for receiving the shaft, at least one elongated split, and at least one elongated aperture for passage of a detent of said shaft for positioning said shaft relative to the handle; and at least one resilient clip positioned on said shank near said collar, said at least one resilient clip being aligned with said at least one split for engagement with a boundary wall of an elongated cavity in an end of the handle to couple said sleeve to the handle;

said boundary wall defining at least one socket aligned with said at least one elongated aperture; and said shaft positioning the detent for engagement with said at least one socket through the elongated aperture to position the tool relatively to the handle.

13. The combination as recited in claim 12 wherein:

the proximal end of said collar has an outer diameter greater than an outer diameter of an adjacent portion of said shank.

14. The combination as recited in claim 12 wherein:

the collar, the shank, and said at least one clip are formed as a unitary part from plastic.

15. The combination as recited in claim 12 comprising:

a pair of opposed elongated splits and a pair of elongated apertures for passage of said detent; and wherein said handle includes a plurality of sockets for receiving said detent.

16. The combination as recited in claim 15 comprising:

a pair of resilient clips, each of said resilient clips being aligned with one of said splits for engagement with the boundary wall of the cavity in the handle.

* * * * *